(12) United States Patent
Sreeramoju et al.

(10) Patent No.: US 10,097,465 B2
(45) Date of Patent: Oct. 9, 2018

(54) DATA TRANSFER BETWEEN ENDPOINTS USING A MULTIPATH CONNECTION

(71) Applicant: NICIRA, INC., Palo Alto, CA (US)

(72) Inventors: Akshay Kumar Sreeramoju, Hyderabad (IN); Madhusudhan Ravi, Palo Alto, CA (US); Benjamin Basler, Palo Alto, CA (US)

(73) Assignee: NICIRA INC., Palo Alto, CA (US)

( * ) Notice: Subject to any disclaimer, the term of this patent is extended or adjusted under 35 U.S.C. 154(b) by 171 days.

(21) Appl. No.: 15/176,179

(22) Filed: Jun. 8, 2016

(65) Prior Publication Data
US 2017/0163539 A1    Jun. 8, 2017

(30) Foreign Application Priority Data
Dec. 8, 2015  (IN) .......................... 6568/CHE/2015

(51) Int. Cl.
*H04L 12/803* (2013.01)
*H04L 29/08* (2006.01)
*H04L 29/06* (2006.01)
*H04L 12/707* (2013.01)
*H04L 12/859* (2013.01)
*H04L 12/851* (2013.01)

(52) U.S. Cl.
CPC ............ *H04L 47/125* (2013.01); *H04L 45/24* (2013.01); *H04L 47/2475* (2013.01); *H04L 47/2483* (2013.01); *H04L 69/163* (2013.01); *H04L 69/326* (2013.01)

(58) Field of Classification Search
CPC ......... H04L 45/22; H04L 45/24; H04L 69/14; H04L 69/16; H04L 61/2007; H04L 61/60227; H04W 80/06; H04W 76/025

USPC ......................................................... 370/235
See application file for complete search history.

(56) References Cited

U.S. PATENT DOCUMENTS

| 9,548,924 | B2 * | 1/2017 | Pettit ..................... H04L 47/125 |
| 9,838,276 | B2 * | 12/2017 | Pettit ..................... H04L 43/026 |
| 2012/0226802 | A1 | 9/2012 | Wu et al. |
| 2012/0331160 | A1 * | 12/2012 | Tremblay ............... H04L 69/14 709/228 |
| 2013/0077501 | A1 | 3/2013 | Krishnaswamy et al. |

(Continued)

OTHER PUBLICATIONS

R. Winter et el., Multipath TCP Support for Single-homed End-systems (draft-wr-mptcp-single-homed-04), published by Internet Engineering Task Force (IETF), dated Feb. 25, 2013, 8 pages.

*Primary Examiner* — Afsar M Qureshi
(74) *Attorney, Agent, or Firm* — SU IP Consulting (57) ABSTRACT

Example methods are provided to perform data transfer between a first endpoint and a second endpoint. The method may comprise detecting an elephant flow of data from an application executing on the first endpoint for transfer to the second endpoint; and splitting the elephant flow to obtain first packets and second packets. The first endpoint may have cognizance of a first path and a second path between a first network interface of the first endpoint and a second network interface of the second endpoint. The method may comprise establishing a first subflow and a second subflow of a multipath connection with the second endpoint; and sending, over the first network interface, the first packets on the first subflow and the second packets on the second subflow to the second network interface.

23 Claims, 8 Drawing Sheets

(56) References Cited

U.S. PATENT DOCUMENTS

| | | | |
|---|---|---|---|
| 2013/0195004 A1* | 8/2013 | Hampel | H04L 69/16 |
| | | | 370/315 |
| 2014/0153583 A1* | 6/2014 | Gouache | H04L 45/24 |
| | | | 370/437 |
| 2014/0269289 A1 | 9/2014 | Effros et al. | |
| 2014/0341023 A1 | 11/2014 | Kim et al. | |
| 2014/0351447 A1 | 11/2014 | Annamalaisami et al. | |
| 2016/0094465 A1 | 3/2016 | Park et al. | |
| 2016/0205586 A1 | 7/2016 | Kim et al. | |
| 2016/0218960 A1* | 7/2016 | Sundarababu | H04L 45/08 |
| 2016/0261722 A1 | 9/2016 | Paasch et al. | |
| 2016/0309534 A1* | 10/2016 | Teyeb | H04L 69/14 |
| 2017/0048146 A1* | 2/2017 | Sane | H04L 47/125 |
| 2017/0163522 A1 | 6/2017 | Sreeramoju et al. | |
| 2017/0163774 A1* | 6/2017 | Boucadair | H04L 69/14 |
| 2017/0163775 A1 | 6/2017 | Ravi et al. | |
| 2018/0062979 A1 | 3/2018 | Zee et al. | |

* cited by examiner

DATA TRANSFER BETWEEN ENDPOINTS USING A MULTIPATH CONNECTION

CROSS-REFERENCE TO RELATED APPLICATIONS

Benefit is claimed under 35 U.S.C. 119(a)-(d) to Foreign Application Serial No. 6568/CHE/2015 filed in India entitled "DATA TRANSFER BETWEEN ENDPOINTS USING A MULTIPATH CONNECTION", on Dec. 8, 2015, by NICIRA, INC., which is herein incorporated in its entirety by reference for all purposes.

The present application is related in subject matter to U.S. patent application Ser. No. 15/176,251 and U.S. patent application Ser. No. 15/091,594, both of which are incorporated herein by reference.

BACKGROUND

Unless otherwise indicated herein, the approaches described in this section are not admitted to be prior art by inclusion in this section.

Communications networks are generally packet-switched networks that operate based on Internet Protocol (IP). When one endpoint (e.g., host) has data to send to another endpoint, the data may be transmitted as a series of packets. Transmission Control Protocol (TCP) is a transport layer protocol that offers reliable data transfer between two endpoints. TCP is connection-oriented protocol that requires endpoints to establish a connection before data transfer occurs. Although widely implemented, TCP is designed to use a single path between the endpoints during the connection, which may not be optimal for network throughput and resource utilization.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Unlike the single-path design of Transmission Control Protocol (TCP), Multipath Transmission Control Protocol (MPTCP) is a multipath connection protocol that utilizes multiple paths simultaneously to transfer data between two endpoints. An MPTCP connection begins similarly to a regular TCP connection, with additional subflows established as required. However, one key constraint of a conventional design of MPTCP is that one or both endpoints must be multi-homed (i.e., having multiple network interfaces) and multi-addressed (i.e., having multiple IP addresses). This makes MPTCP unsuitable for endpoints that are single-homed (i.e., having one network interface), even when multiple paths are available further within the network.

Figure 1:
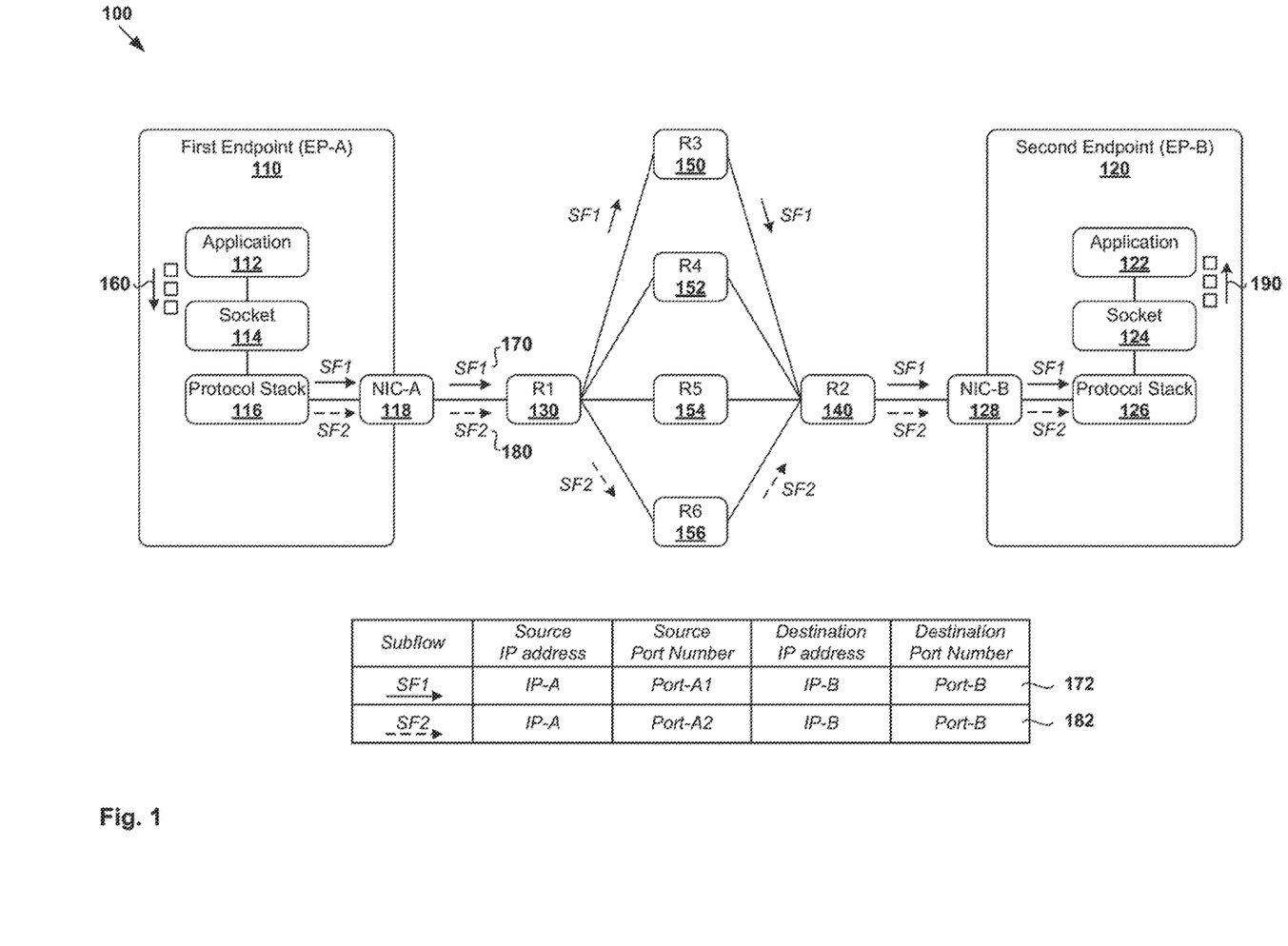
FIG. 1 is a schematic diagram illustrating example network environment in which data transfer between endpoints may be implemented.

To illustrate the above in more detail, FIG. 1 is a schematic diagram illustrating example network environment 100 in which data transfer between endpoints may be implemented. It should be understood that network environment 100 may include additional and/or alternative components than that shown, depending on the desired implementation. Network environment 100 includes first endpoint 110 (see "EP-A") and second endpoint 120 (see "EP-B"). Here, the term "endpoint" may refer generally an originating or terminating node of a bi-directional inter-process communication flow. In practice, endpoint 110/120 may be implemented or supported by any suitable computing device, such as a physical host computing device, virtual machine tuning on a computing device within a virtualized computing environment, etc.

Each endpoint 110/120 executes application 112/122 (one shown for simplicity) having access to protocol stack 116/126 via socket 114/124. Protocol stack 116/126 is divided into several layers, such as transport layer, network layer, etc. Socket 114/124 serves as a protocol-independent interface for application 112/122 to access protocol stack 116/126. For example, when application 112 (e.g., web browser) on EP-A 110 (e.g., acting as a client) connects to EP-B 120 (e.g., acting as a server), socket 114 may be created to establish a connection between EP-A 110 and EP-B 120. In practice, endpoint 110/120 may be implemented using a physical host, virtual machine running within a virtualized computing environment, etc.

EP-A 110 and EP-B 120 are single-homed and connected via various intermediate devices, such as R1 130, R2 140, R3 150, R4 152, R5 154 and R6 156. Each intermediate device may be any suitable physical or virtual network device, such as a router, switch, gateway, any combination thereof, etc. EP-A 110 is connected to R1 130 via first network interface NIC-A 118 and EP-B 120 to R2 140 via second network interface NIC-B 128. Here, the term "network interface" may refer generally to any suitable component that connects an endpoint to a network, such as a network interface controller or card (NIC), etc. R1 130 provides multiple paths between EP-A 110 and EP-B 120. A first path is formed by the connection between R1 130 and R2 140 via R3 150, a second path via R4 152, a third path via R5 154, and a fourth path via R6 156.

According to conventional MPTCP (e.g., defined in Request for Comments (RFC) 6824 published by the Internet Engineering Task Force (IETF)), EP-A 110 and EP-B 120 are not able to establish an MPTCP connection because they are both single-homed. In this case, EP-A 110 and EP-B 120 may only communicate via a single-path TCP connection over network interfaces NIC-A 118 and NIC-B 128, thereby only utilizing 25% of the available paths available (i.e., one in four) between them. In practice, this usually satisfies a fairness requirement of TCP's congestion control mechanism. However, establishing a single-path TCP connection when multiple paths are available produces suboptimal performance, which is especially evident when transferring elephant flows.

Throughout the present disclosure, the term "elephant flow" may generally refer to a large amount of data that usually requires a long period of time to transfer. For example, an elephant flow may represent a long-lived and/or continuous traffic flow associated with a high volume data transfer where throughput is usually more important than latency. Unfortunately, the presence of elephant flows tends to fill up network buffers and cause congestion that leads to performance degradation.

According to examples of the present disclosure, data transfer may be improved in network environment 100 by establishing an MPTCP connection between single-homed endpoints to transfer an elephant flow. For example, unlike conventional MPTCP, multiple subflows may be established based on cognizance of multiple paths between one pair of network interfaces. For example in FIG. 1, first subflow 170 (see "SF1") and second subflow 180 (see "SF2") may be established between first network interface NIC-A 118 of EP-A 110 and second network interface NIC-B 128 of EP-B 120. This allows EP-A 110 and EP-B 120 to exploit the multiple paths between them to improve application throughput and latency and reduce the likelihood of congestion in network environment 100.

More detailed examples will be discussed with reference to FIG. 2, which is a flowchart of an example process 200 to perform data transfer between endpoints 110, 120 using a multipath connection. Example process 200 may include one or more operations, functions, or actions illustrated by one or more blocks, such as blocks 210 to 250. The various blocks may be combined into fewer blocks, divided into additional blocks, and/or eliminated depending on the desired implementation.

In the following, although "multipath connection" is exemplified using an MPTCP connection, it should be understood that other suitable protocol may be used. In general, the term "multipath connection" may refer generally to a set of subflows between two endpoints. The mapping between an MPTCP connection and socket 114/124 is generally one-to-one. For example in FIG. 1, application 112 only needs to open one socket 114 to establish subflows SF1 170 and SF2 180 for elephant flow 160. The term "subflow" may refer generally to a flow of data over a path formed by a sequence of links between two endpoints. Further, although two subflows are described, the number of subflows of an MPTCP connection is not fixed, and adjustable during the lifetime of the MPTCP connection.

Figure 2:
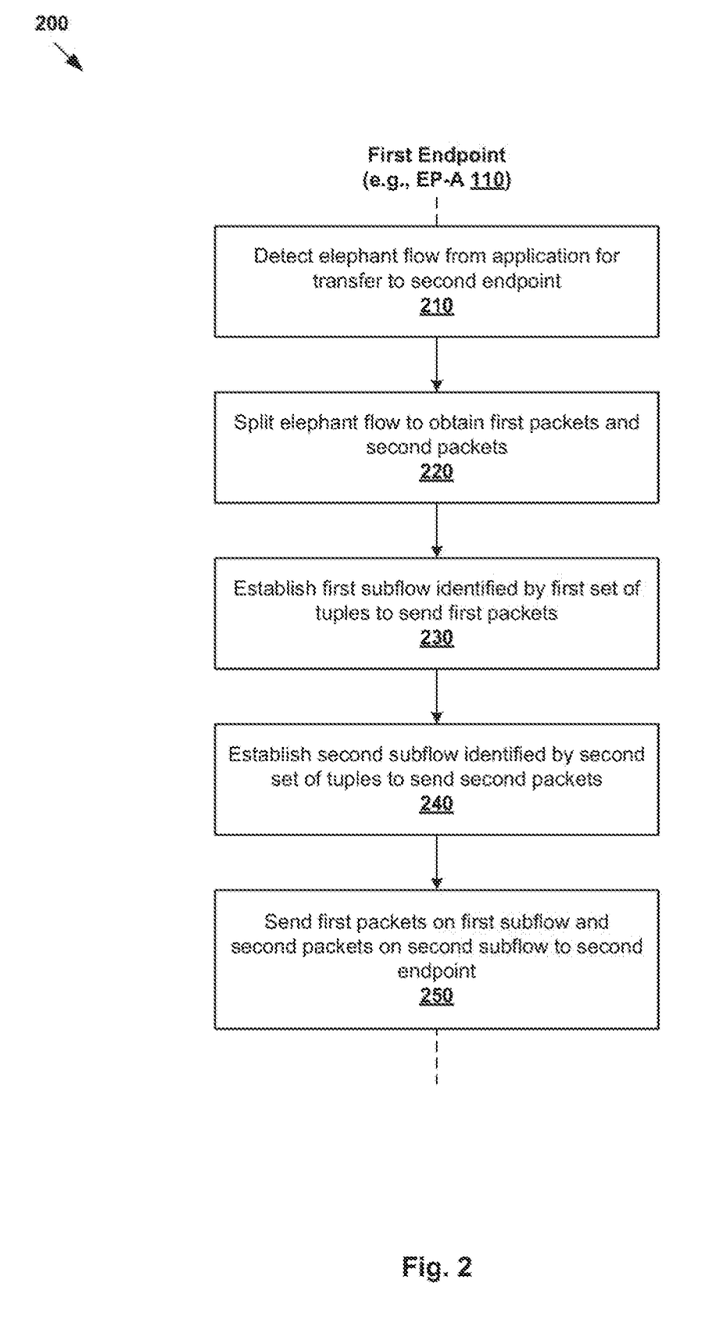
FIG. 2 is a flowchart of an example process to perform data between endpoints using a multipath connection.

Referring first to 210 in FIG. 2, EP-A 110 detects elephant flow 160 from application 112 executing on EP-A 110 for transfer to EP-B 120. Elephant flow 160 may be detected using any suitable approach. In one example, the detection may be based on a characteristic of elephant flow 160, such as amount of data (e.g., number of bytes), duration and data transfer rate associated with elephant flow 160. In another example, an application-aware approach may be used to detect elephant flow 160 based on an attribute of application 112, such as the type of application 112 that usually requires high volume data transfers. Further examples will be discussed using FIG. 3 and FIG. 4.

At 220 in FIG. 2, EP-A 110 splits elephant flow 160 to obtain first packets and second packets. Here, "first packets" and "second packets" represent smaller flows that are split from elephant flow 160. The term "packets" may refer generally to a group of bits that can be transported together from a source to a destination, and may be in another form, such as "frames", "messages", "segments", etc.

In particular, according to examples of the present disclosure, EP-A 110 has cognizance of a first path (e.g., via R1 130, R3 150 and R2 140) and a second path (e.g., via R1 130, R6 156 and R2 140) between NIC-A 118 of EP-A 110 and NIC-B 128 of EP-B 120. In one example, EP-A 110 may operate in multiple operation modes, and the detection of elephant flow 160 at 210 in FIG. 2 may activate a mode in which elephant flow 160 is split at 220 in FIG. 2. In another example, elephant flow 160 may be split based on the cognizance of the first path and the second path. Any other suitable implementation that exploits the cognizance may be used.

The term "cognizance" above may generally refer to EP-A 110 having awareness or knowledge of multiple paths leading to EP-B 120. Such cognizance may then be exploited to send elephant flow 160 using an MPTCP connection. In practice, since multiple paths are not directly available at EP-A 110, EP-A 110 are usually not aware of the multiple paths. As will be described using FIG. 3, FIG. 4 and FIG. 5, EP-A 110 may have cognizance of the multiple paths when configured to operate in a "network-cognizant mode."

At 230 in FIG. 2, EP-A 110 establishes first subflow SF1 170 of an MPTCP connection with EP-B 120 over NIC-A 118. SF1 170 may be identified by first set of tuples 172 configured by EP-A 110. The term "set of tuples" may generally refer to a 4-tuple in the form of (source IP address, source port number, destination IP address, destination port number) for uniquely identifying a bi-directional connection between EP-A 110 and EP-B 120. In practice, a 5-tuple set (i.e., 4-tuple plus protocol information) may also be used. In the example in FIG. 1, first set of tuples 172 is configured as (IP-A, Port-A1, IP-B, Port-B). As will be described further using FIG. 4, the establishment process may involve a three-way handshake between EP-A 110 and EP-B 120.

At 240 in FIG. 2, EP-A 110 establishes second subflow SF2 180 of the MPTCP connection with EP-B 120 over NIC-A 118. SF2 180 may be identified by second set of tuples 182 configured by EP-A 110. In the example in FIG. 1, second set of tuples 182 is configured as (IP-A, Port-A2, IP-B, Port-B), which shares the same source IP address, destination IP address and destination port number as SF1 170. However, a different source port number (i.e., Port-A2 instead of Port-A1) is configured to distinguish SF2 180 from SF1 170. Similar to SF1 170, SF2 180 may be established using a three-way handshake between EP-A 110 and EP-B 120.

At 250 in FIG. 2, EP-A 110 sends first packets on SF1 170 and second packets on SF2 180 over NIC-A 118. In the example in FIG. 1, R1 130 provides a first path from EP-A 110 to EP-B 120 via R3 150, and a second path via R6 156. In the example in FIG. 1, first packets on SF1 170 travel on a first path from EP-A 110 to EP-B 120 based on first set of tuples 172 included in each first packet. Second packets on SF2 may travel on a second path from EP-A 110 to EP-B 120 based on second set of tuples 182 include in each second packet.

Example process 200 is suitable for network environments with intermediate devices (i.e., middle boxes) running features such as Equal Cost Multipath (ECMP) routing, NIC teaming, Link Aggregation Control Protocol (LACP), etc. In this case, path selection or flow balancing is usually performed at the intermediate devices based on the tuples configured for each subflow. At the destination, EP-B 120 receives first packets on subflows SF1 170 and second packets on SF2 180 via NIC-B 128 and reassembles them for delivery to application 122 (see 190).

Example process 200 may be implemented by protocol stack 116/126 (e.g., TCP/MPTCP layer) without changing application 112/122 and socket 114/124. It should be understood that it is not necessary to introduce any software and/or hardware changes to intermediate devices R1 130 to R6 156 to implement example process 200. Since there are usually many intermediate devices connecting a pair of endpoints, the costs of implementing example process 200 may be reduced.

As explained above, example process 200 does not necessitate one or both of EP-A 110 and EP-B 120 to be multi-homed and multi-addressed. In the example in FIG. 1, the same pair of network addresses (e.g., source IP-A and destination IP-B) and same pair of network interfaces (e.g., NIC-A 118 and NIC-B 128) may be used for different subflows. By mitigating the need for multiple network interfaces, both capital expenditure (CAPEX) and operational expenditure (OPEX) may be reduced in network environment 100. Further, by reducing the need to allocate multiple IP addresses to each endpoint, IP address management (IPAM) associated with the planning, tracking and management of IP address space may be reduced.

In the following, various examples will be explained with reference to FIG. 3 to FIG. 8. In particular, an example implementation in a data center environment will be discussed with reference to FIG. 3, FIG. 4 and FIG. 5; example path selection with reference to FIG. 6 and FIG. 7; and example implementation using multi-homed endpoints in FIG. 8.

Network-Cognizant Mode

Figure 3:
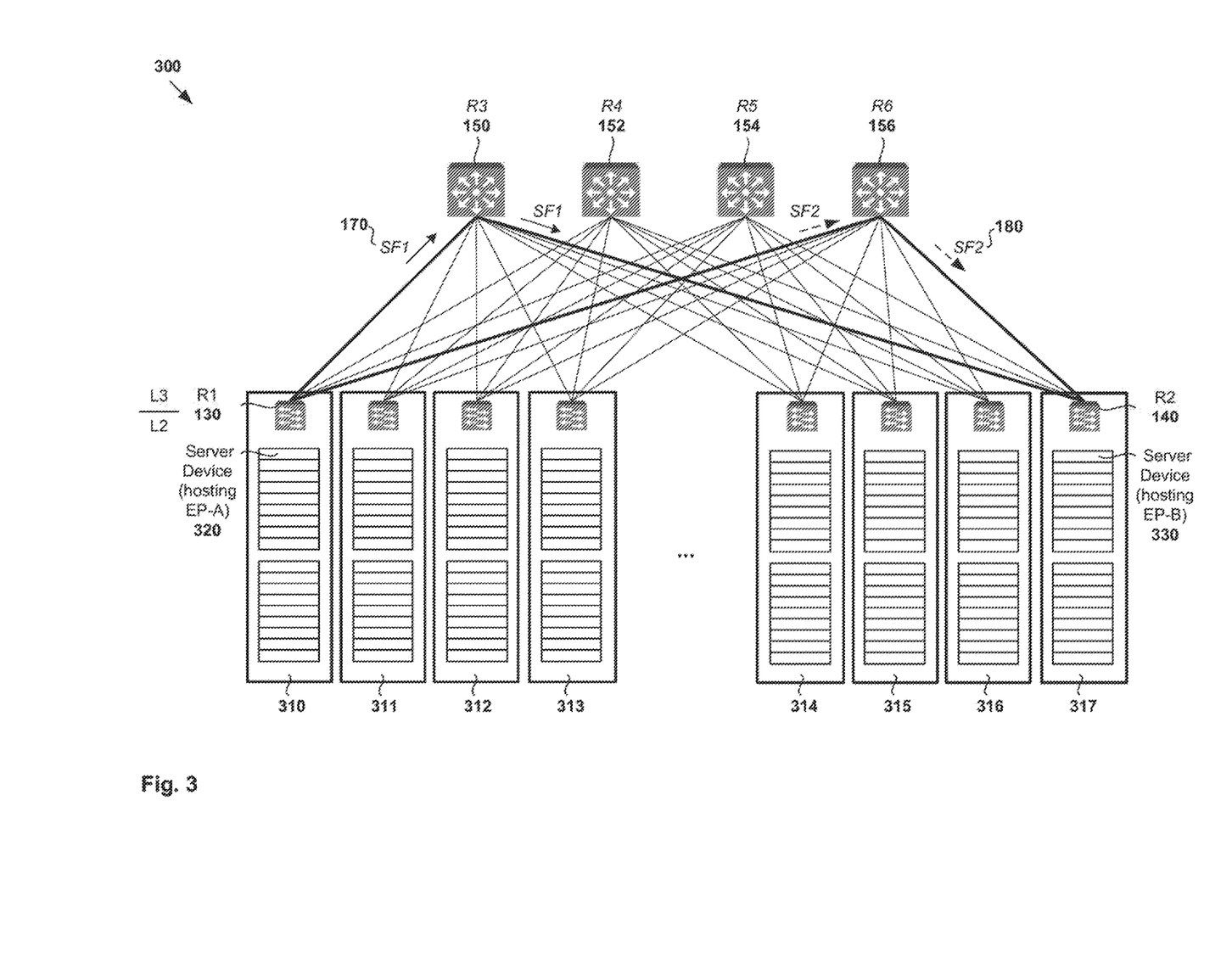
FIG. 3 is a schematic diagram illustrating an example data center environment in which the example process in FIG. 2 may be implemented.

In the following examples, network environment 100 in FIG. 1 represents a data center environment. FIG. 3 is a schematic diagram illustrating example data center environment 300 in which example process 200 in FIG. 2 may be implemented. It should be understood that data center environment 300 may include additional and/or alternative components than that shown, depending on the desired implementation.

In more detail, data center environment 300 employs a leaf-spine topology with inter-connected leaf switches and spine switches. Compared to a conventional three-tier topology, the leaf-spine topology improves scalability, reliability and efficiency in data center environment 300. Rack units 310-317 (also known as racks) are used to house physical server devices, each hosting physical hosts or virtual machines capable of acting as endpoints. For example, EP-A 110 is supported by first server device 320 of left-most rack unit 310 and EP-B 120 by second server device 322 of right-most rack unit 317.

It should be understood that a "virtual machine" is one form of workload. In general, a workload may represent an addressable data compute node or isolated user space instance. In practice, any suitable technologies aside from hardware virtualization may be used to provide isolated user space instances. For example, other workloads may include physical hosts, client computers, containers (e.g., running on top of a host operating system without the need for a hypervisor or separate operating system), virtual private servers, etc. The virtual machines may also be complete computation environments, containing virtual equivalents of the hardware and system software components of a physical computing system.

Server devices are inter-connected via top-of-rack (ToR) leaf switches and spine switches. For example, intermediate devices R1 130 and R2 140 (introduced in FIG. 1) may represent leaf switches, and R3 150, R4 152, R5 154 and R6 156 spine switches in data center environment 300. All leaf switches are connected to all spine switches, but leaf switches and spine switches are not connected directly to each other. Each leaf switch operates at a layer-2/layer-3 boundary and acts as a getaway from a layer-2 network onto a layer-3 distributed fabric formed by the spine switches. As used herein, the term "layer-2" generally refers to a Media Access Control (MAC) layer and "layer-3" to a network layer in the Open System Interconnection (OSI) model, although the concepts described herein may be applicable to other networking models.

Due to the leaf-spine topology, all server devices are exactly the same number of hops away from each other. For example, packets from left-most rack unit 310 to right-most rack unit 317 may be routed with equal cost via any one of spine switches R3 150, R4 152, R5 154 and R6 156. Leaf switches and/or spine switches may implement flow balancing features such as ECMP routing, NIC teaming, LACP, etc. For example, leaf switch R1 130 is ECMP-capable and configured to distribute subflows from downstream server device 320 hosting EP-A 110 to any one of the upstream spine switches R3 150, R4 152, R5 154 and R6 156.

Figure 4:
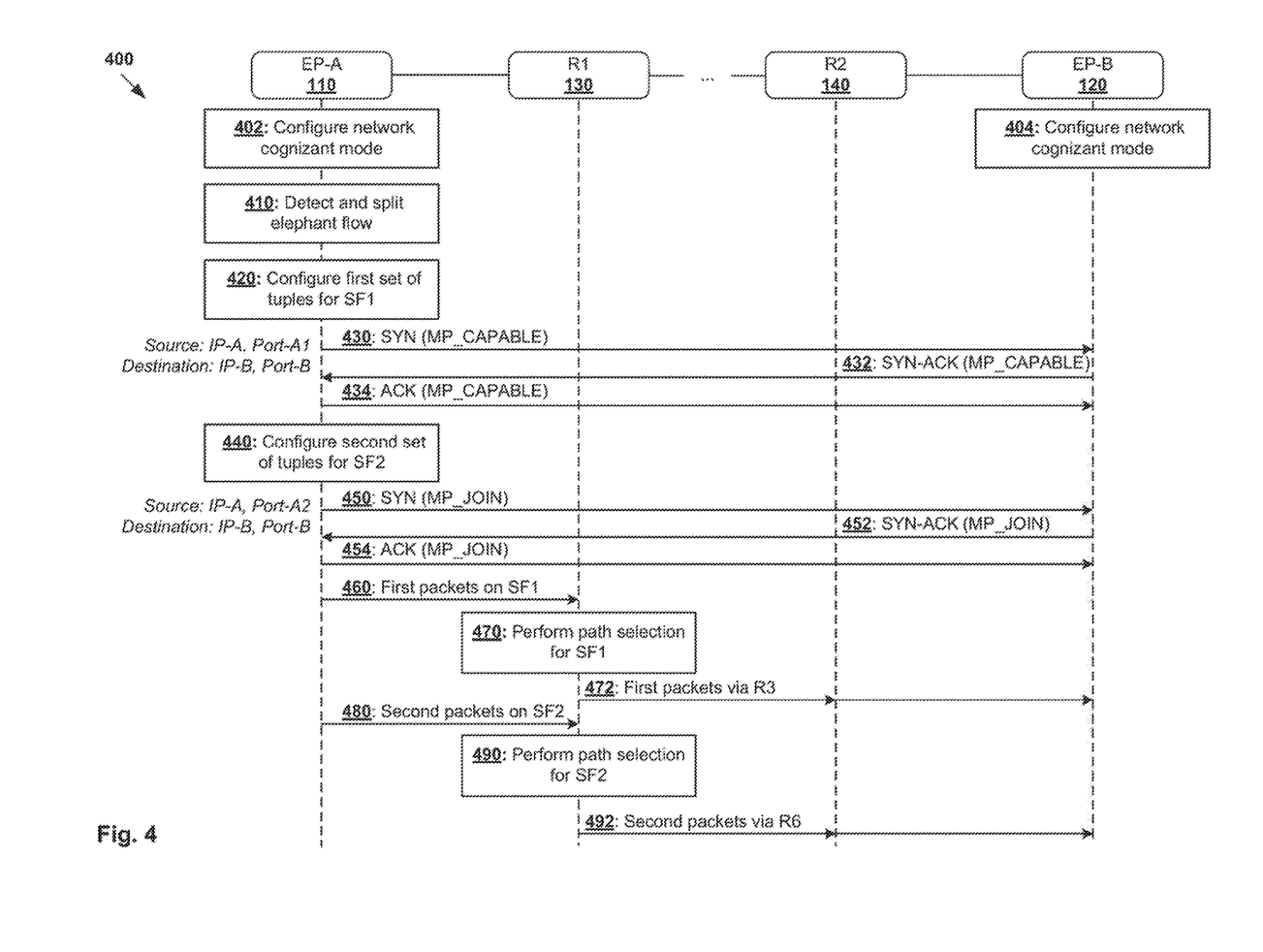
FIG. 4 is a flow diagram illustrating example communication in the example data center environment to establish a first subflow and a second subflow of a multipath connection.

Any elephant flow 160 detected in data center environment 300 may be split into smaller flows to improve path utilization and reduce the likelihood of congestion. FIG. 4 is a flow diagram illustrating example communication 400 in data center environment 300 in FIG. 3 to establish first subflow 170 and second subflow 180 of a multipath connection. In this example, the implementation is illustrated using one or more operations, functions, or actions, such as 402 to 492. The various operations, functions, or actions may be combined, divided, and/or eliminated based upon the desired implementation.

At 402 and 404 in FIG. 4, EP-A 110 and EP-B 120 are configured to operate in a network-cognizant mode in which they have cognizance of the multiple paths between them. The term "network-cognizant" may refer generally to one endpoint (e.g., EP-A 110) having awareness or knowledge of the multiple paths (e.g., further within the network) that lead to another endpoint. When operating in the network-cognizant mode, EP-A 110 is able to take advantage of the multiple paths by establishing an MPTCP connection to perform data transfer. With such cognizance, the different paths provided by spine switches R3 150, R4 152, R5 154 and R6 156 may be better utilized to improve application throughput and latency. This mode of MPTCP may be known as multi-link cognizant MPTCP (MLTCP).

When configuring the network-cognizant mode at 402 and 404, the maximum number of subflows (i.e., MAX_SF) for an MPTCP connection may be configured. In practice, MAX_SF may be configured based on the maximum number of paths between EP-A 110 and EP-B 120. For example in FIG. 3, the maximum number of subflows may be set to four (i.e., MAX_SF=4), which is also the number of spine switches (i.e., next hops) connected to each leaf switch.

Further, it is not necessary for EP-A 110 and EP-B 120 to learn the specific paths (e.g., specific links forming each path) available and cognizance of their existence is sufficient.

In practice, any suitable approach may be used to configure the network-cognizant mode and/or MAX_SF. For example, the configuration may be performed by a user (e.g., network administrator) who has knowledge of the leaf-spine topology and the number of leaf and spine switches in data center environment 300. It is also possible to initiate the configuration programmatically (e.g., using a script), such as based on relevant information (e.g., message, trigger, etc.) from a leaf switch, spine switch, endpoint, management entity or device (not shown for simplicity), etc.

At 410 in FIG. 4 (related to 210 and 220 in FIG. 2), EP-A 110 detects elephant flow 160 from application 112 for transfer to EP-B 120. Since EP-A 110 operates in the network-cognizant mode after the configuration at 402, EP-A 110 has cognizance of the multiple paths between EP-A 110 and EP-B 120. In this case, EP-A 110 splits elephant flow 160 to obtain smaller flows in the form of first packets and second packets to improve performance.

Any suitable approach may be used by EP-A 110 to detect elephant flow 160. United States Published Patent Application Nos. 20150163142 and 20150163144 assigned to Nicira, Inc. are fully incorporated by reference herein to explain possible approaches for elephant flow detection. For example, the detection may be based on a characteristic of elephant flow 160, such as amount of data (e.g., number of bytes), duration and data transfer rate associated with elephant flow 160. EP-A 110 may monitor socket 114 (e.g., socket buffer), such as to determine the amount of data provided by application 112 to socket 114 during a given period of time to calculate a rate at which the data is provided. If the rate exceeds a predetermined value, EP-A 110 may determine that the data is elephant flow 160.

In another example, EP-A 110 to detect elephant flow 160 based on an attribute of application 112, such as the type of application that usually requires high volume data transfers. For example in data center environment 300, applications that generate elephant flows 160 may be associated with virtual machine migrations, backups, cloning, file transfers, data placement on a virtual storage area network (SAN), fault tolerance, high availability (HA) operations, etc. In some cases, data transfers may involve sending large amount Internet Small Computer System Interface (iSCSI) traffic and/or Network File System (NFS) traffic between endpoints.

At 420 in FIG. 4 (related to 230 in FIG. 2), EP-A 110 configures first set of tuples 172 identifying subflow SF1 170. For example, first set of tuples 172=(source IP address=IP-A, source port number=Port-A1, destination IP address=IP-B, destination port number=Port-B).

At 430, 432 and 434 in FIG. 4 (related to 230 in FIG. 2), a three-way handshake is used to establish SF1 170. At 430, EP-A 110 sends a synchronization (SYN) packet to EP-B 120. At 432, EP-B 120 responds with a synchronization-acknowledgement (SYN-ACK) packet, to which EP-A 110 responds with an ACK packet at 434. Option MP_CAPABLE is used in the SYN, SYN-ACK and ACK packets to allow EP-A 110 and EP-B 120 to verify that MPTCP is supported, and exchange key information for subsequent addition of subflows.

At 440 in FIG. 4 (related to 240 in FIG. 2), EP-A 110 configures second set of tuples 182 for identifying subflow SF2 180, such as (source IP address=IP-A, source port number=Port-A2, destination IP address=IP-B, destination port number=Port-B). In both cases of SF1 170 and SF2 180, MAC-A of NIC-A 118 is used as the source MAC address and MAC-B of NIC-B 128 as the destination MAC address.

At 450, 452 and 454 in FIG. 4 (related to 240 in FIG. 2), a three-way handshake is also used to establish subflow SF2 180. At 450, EP-A 110 sends a SYN packet to EP-B 120. At 452, EP-B 120 responds with a SYN-ACK packet, and at 454, EP-A 110 responds with an ACK packet to complete the handshake. Instead of MP_CAPABLE, option MP_JOIN is used in the SYN, SYN-ACK and ACK packets to identify the MPTCP connection joined by the new subflow SF2 180. In practice, key information exchanged in the initial MP_CAPABLE handshake (see 430, 432 and 434) will be used in the MP_JOIN option.

At 460 and 480 in FIG. 4 (related to 250 in FIG. 2), EP-A 110 sends the first packets and second packets of elephant flow 160 via network interface NIC-A 118 to EP-B 120. In particular, each first packet that includes first set of tuples 172 is sent on SF1 170, and each second packet that includes second set of tuples 182 on SF2 180.

During packet forwarding, next-hop router R1 130 performs path selection based on tuples 172/182 configured for each subflow 170/180. For example, at 470 and 472 in FIG. 4, R1 130 performs path selection based on first set of tuples 172 of SF1 170 to select spine switch R3 150 as the next hop. On the other hand, at 490 and 492 in FIG. 4, R1 130 selects R6 156 as the next hop based on second set of tuples 182 of SF2 180. In this case, R1 130 sends packets of SF1 170 to EP-B 120 via spine switch R3 150, and packets of SF2 180 via R6 156. Any suitable path selection algorithm may be used.

Figure 5:
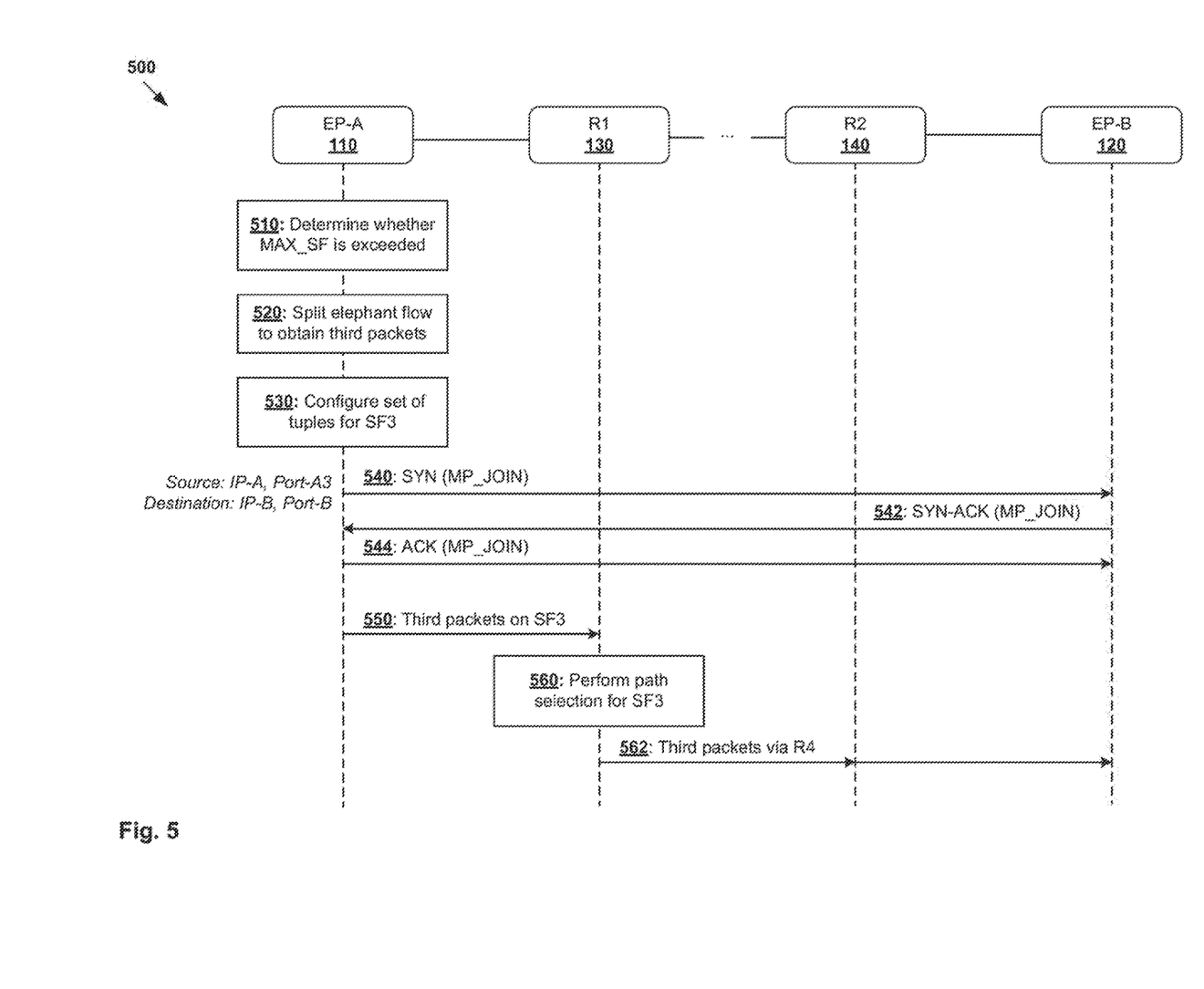
FIG. 5 is a flow diagram illustrating example communication in the example data center environment in FIG. 3 to establish a third subflow of a multipath connection.

Although two subflows are shown in FIG. 4, any additional subflow may be established as required. As an example, FIG. 5 is a flow diagram illustrating example communication 500 in example data center environment 300 in FIG. 3 to establish a third subflow of a multipath connection. The example in FIG. 5 is illustrated using one or more operations, functions, or actions, such as 510 to 562. The various operations, functions, or actions may be combined, divided, and/or eliminated based upon the desired implementation.

At 510 in FIG. 5, EP-A 110 determines whether to establish the third subflow ("SF3", not shown in FIG. 3 for simplicity) with EP-B 120 based on the maximum number of subflows (e.g., MAX_SF). For example, EP-A 110 may determine that establishing subflow SF3 would not exceed the maximum of MAX_SF=4 set during network-cognizant mode configuration at 402 in FIG. 4. This also indicates to EP-A 110 that there are four paths available for the MPTCP connection. At 520 in FIG. 5, EP-A 110 splits elephant flow 160 to obtain third packets. For example, EP-A 110 may be relying on the cognizance of a third path between NIC-A 118 and NIC-B 128.

At 530 in FIG. 5, EP-A 110 configures a third set of tuples for subflow SF3. Similar to first set 172 and second set 182, the third set may include the same source IP address (e.g., IP-A of EP-A 110), destination IP address (e.g., IP-B of EP-B 120) and destination port number (e.g., Port-B). However, a different source port number (e.g., Port-A3) is configured for subflow SF3 to distinguish it from SF1 170 and SF2 180.

At 540, 542 and 544 in FIG. 5, a three-way handshake is used to establish subflow SF3. EP-A 110 sends a SYN packet to EP-B 120 at 540, EP-B 120 responds with a SYN-ACK packet at 542 and, to complete the handshake, EP-A 110 responds with an ACK packet at 544. Option MP_JOIN is used in the SYN, SYN-ACK and ACK packets to identify the same MPTCP connection associated with subflows SF1 170 and SF2 180.

At 550 in FIG. 4, EP-A 110 sends packets of subflow SF3 to EP-B 120 via NIC-A 118 and leaf switch R1 130. At 560 and 562 in FIG. 5, R1 130 performs path selection based on the third set of tuples configured at 530 to select spine switch R4 152 as the next hop.

The number of subflows established during the MPTCP connection may depend on any suitable factors. For example, besides the maximum number of subflows (e.g., MAX_SF=4) configured above, the number of subflows may depend on the amount of data to be transferred, link speed between leaf switches and spine switches, etc. In general, as more subflows are established, the overheads associated with subflow establishment, management, buffering, reassembly and termination will also increase. In practice, the maximum number of subflows (e.g., MAX_SF=4) may be manually configured as discussed with reference to FIG. 4. A more dynamic approach may also be used, such as based on data relating to congestion and packet loss in data center environment 300.

Influencing Path Selection

In the above examples, an ideal situation is described where path selection by intermediate device R1 130 results in different paths for different subflows. This achieves an even spread of traffic because a first path via R3 150 is selected for subflow SF1 170 (see 470 in FIG. 4), a second path via R6 156 for subflow SF2 180 (see 490 in FIG. 4) and a third path via R4 152 for subflow SF3 (see 560 in FIG. 5).

In practice, however, path selection by R1 130 does not always produce optimal results. For example, using ECMP routing, R1 130 uses flow tuple hashing (FTH) to calculate a hash value that maps a set of tuples to one of the available next hops, such as in the form of Hash(source IP address, source port number, destination IP address, destination port number). Although different source port numbers are used for different subflows, there is a one in four chance (i.e., probability=0.25) of selecting the same path for different subflows.

To achieve an even spread of subflows over the available paths, it is assumed that the hash function produces enough randomness (or pseudo-randomness). This assumption may be valid over a large number of subflows established over a period of time for different connections. However, for a particular MPTCP connection, there may only be a small number of temporally concentrated and inter-related subflows. As such, depending on how first set 172 and second set 182 are configured, it is not always guaranteed that different paths are selected at 470 and 490 in FIG. 4. An uneven spread of traffic is suboptimal and undesirable because some next hops are potentially congested (and becoming bottlenecks) while others remain under-utilized.

One conventional approach to avoid an uneven spread of traffic is to configure an intermediate device (e.g., R1 130) to shuffle subflows across the available next hops periodically. However, this usually disrupts the subflows, potentially causing packet loss and reordering that will adversely affect application throughput and latency. To perform the shuffling, it is also necessary to maintain state information of each subflow, which increases the processing burden at the intermediate device.

Figure 6:
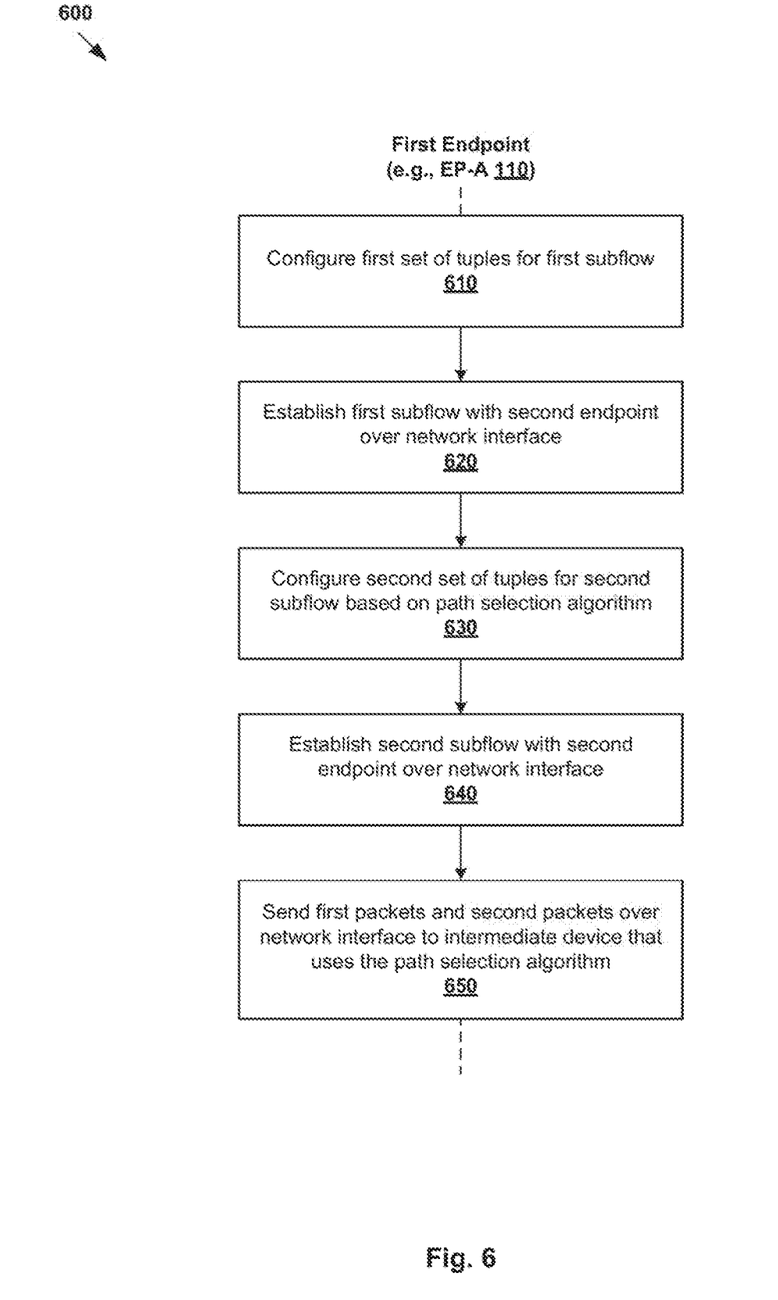
FIG. 6 is a flowchart of an example process to influence path selection during a multipath connection between endpoints.

According to examples of the present disclosure, an endpoint (e.g., EP-A 110) may be configured to influence path selection by an intermediate device (e.g., R1 130) to improve the spread of subflows over the paths available. In more detail, FIG. 6 is a flowchart of example process 600 to influence path selection during a multipath connection between endpoints 110, 120. Example process 600 may include one or more operations, functions, or actions illustrated by one or more blocks, such as blocks 610 to 650. The various blocks may be combined into fewer blocks, divided into additional blocks, and/or eliminated based upon the desired implementation.

Similar to example process 200 in FIG. 2, EP-A 110 configures first set of tuples 172 to establish SF1 170 (see 610 and 620 in FIG. 6); configures second set of tuples 182 to establish SF2 180 (see 630 and 640 in FIG. 6); and sends first packets of SF1 170 and second packets of SF2 180 via network interface NIC-A 118 to R1 130 (see 650 in FIG. 6).

To influence the path selection at R1 130, at 630 in FIG. 6, second set of tuples 182 is configured based on a path selection algorithm learned by EP-A 110. Second set of tuples 182 is configured to generate a second hash value that is different to a first hash value generated for first set of tuples 172 according to the path selection algorithm. The purpose is to influence R1 130 to select different paths based on the hash values, such as selecting first path via R3 150 for SF1 170 and second path via R6 156 for SF2 180 using the same path selection algorithm.

In one example, the configuration at 630 in FIG. 6 is performed by configuring a source port number (e.g., Port-A2) for subflow SF2 180 based on the source port number (e.g., Port-A1) for subflow SF1 170. As such, although the same source IP address (e.g., IP-A), destination IP address (e.g., IP-B) and destination port number (e.g., Port-B) are used for different subflows, different hash values (i.e., H1≠H2) may be produced for the following:

H1=Hash(IP-A, Port-A1, IP-B, Port-B) for subflow SF1
H2=Hash(IP-A, Port-A2, IP-B, Port-B) for subflow SF2

The configuration at 630 in FIG. 6 is based a path selection algorithm used by R1 130. For example, EP-A 110 may learn the path selection algorithm based on a manual configuration by a network administrator, such as when configuring the network-cognizant mode at 402 in FIG. 4 (see also 404 for EP-B 120). A more dynamic approach may also be used, such as EP-A 110 learning the path selection algorithm based on information (e.g., messages) received from R1 130 or a management device (not shown for simplicity).

Figure 7:
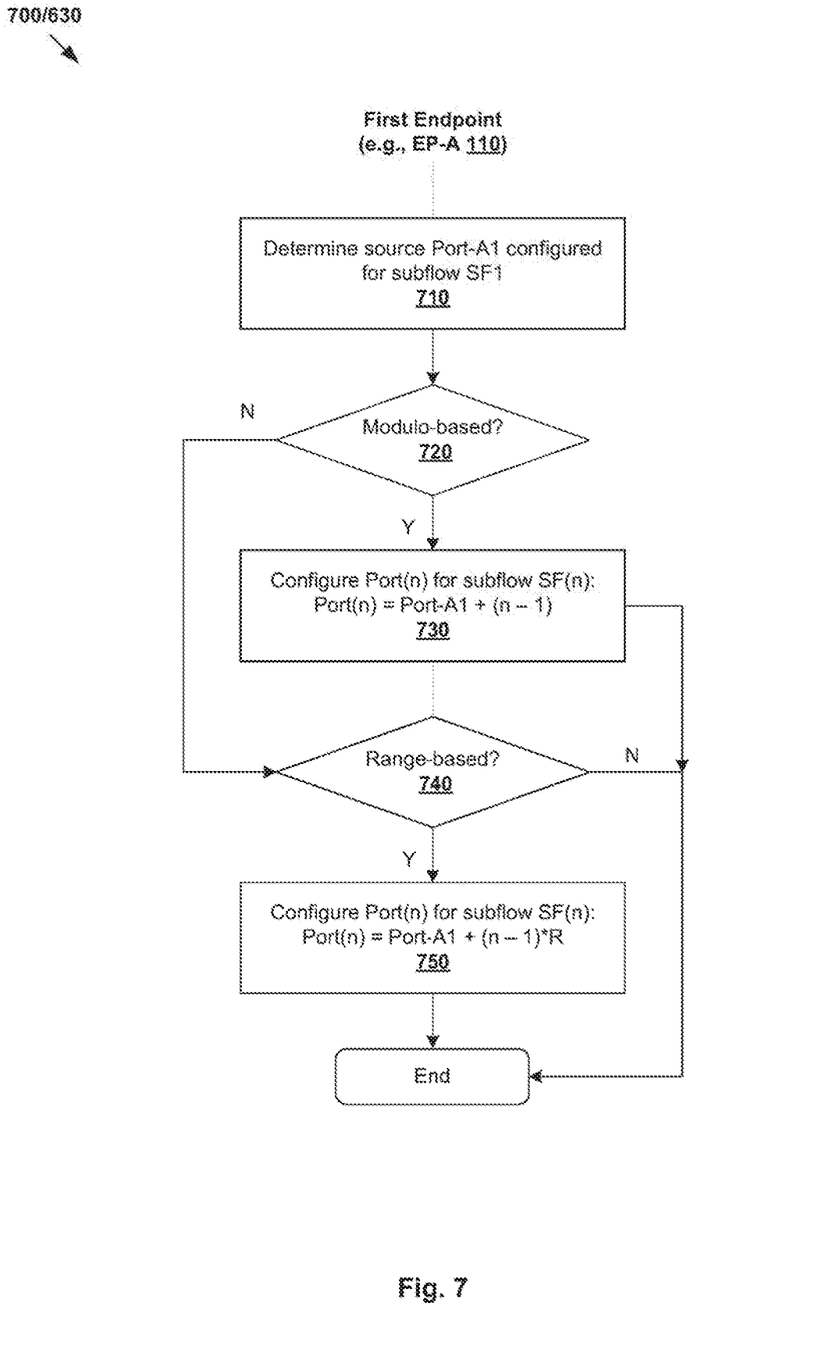
FIG. 7 is a flowchart of an example process to configure a source port number for a subflow.

In more detail, FIG. 7 is a flowchart of example process 700 to configure a source port number for a subflow. Example process 700 may include one or more operations, functions, or actions illustrated by one or more blocks, such as blocks 710 to 760. The various blocks may be combined into fewer blocks, divided into additional blocks, and/or eliminated based upon the desired implementation. Example process 700 may be performed by EP-A 110 when establishing the nth subflow with EP-B 120, where n=2, . . . , MAX-SF. For simplicity, the case of n=2 for SF2 180 will be explained below.

At 710 in FIG. 7, EP-A 110 determines that the source port number configured for subflow SF1 170 is Port-A1, such as by retrieving it from any suitable storage. EP-A 110 may then configure Port-A2 based on Port-A1. Two example algorithms that employ flow tuple hashing (FTH) are shown in FIG. 7 but it will be appreciated that EP-A 110 may learn any suitable path selection algorithm used by R1 130.

According to a modulo-based algorithm at 720 and 730 in FIG. 7, the source port number for subflow SF2 may be configured as Port-A2=Port-A1+1. This ensures that hash value H2 generated for subflow SF2 180 is immediately next to, and therefore different from, hash value H1 for subflow SF1 170, as follows:

H1=Hash(IP-A, Port-A1, IP-B, Port-B) for subflow SF1

H2=Hash(IP-A, Port-A1+1, IP-B, Port-B) for subflow SF2

Alternatively, according to a range-based algorithm at 740 and 750 in FIG. 7, the source port number for subflow SF2 180 may be configured as Port-A2=Port-A1+R. Here, R is the size of the range used by R1 130 and generally capped (e.g., to MAX USHORT). Similarly, this configuration ensures that hash value H2 for subflow SF2 180 is in the immediately next range, and therefore different from, hash value H1 for subflow SF1 170, as follows:

H1=Hash(IP-A, Port-A1, IP-B, Port-B) for subflow SF1
H2=Hash(IP-A, Port-A1+R, IP-B, Port-B) for subflow SF2

The above may be repeated for any subsequent subflow. For example, for n=3 (i.e., subflow SF3), Port-A3=Port-A1+2 according to the modulo-based algorithm and Port-A3=Port-A1+2*R according to the range-based algorithm. This configuration ensures that H3=Hash(IP-A, Port-A3, IP-B, Port-B) immediately next to, or in a range immediately next to that of, H2=Hash(IP-A, Port-A2, IP-B, Port-B). This is to ensure that a different next hop, and therefore path, is selected for subflow SF2 180.

Using the example approach in FIG. 6 and FIG. 7, EP-A 110 may be described as "ECMP-aware" and the selected source port as "ECMP-aware ephemeral port (EAEP)". Here, the term "ECMP-aware" refers to EP-A 110 learning the path selection algorithm used by its next-hop, ECMP-based R1 130. In practice, this approach provides better guarantee of throughput improvements, at no additional cost to the administration or management of R1 130. Since example processes 600 and 700 are implemented by EP-A 110, it is not necessary to perform any software and/or hardware update to R1 130, reducing implementation costs.

According to the examples in FIG. 6 and FIG. 7, R1 130 is able to spread different subflows more evenly to available paths (and associated next-hop network devices) in a "stateless" manner. This should be contrasted with "stateful" approaches that necessitate R1 30 to maintain state information of subflows to, for example, shuffle them periodically. Although modulo-based and range-based algorithms are provided as examples, it should be understood that any other suitable path selection algorithms used by intermediate devices may be learned by EP-A 110 and EP-B 120. For example, more complex algorithms may be learned, such as hash-threshold algorithm, highest random weight algorithm (HRW), etc.

Examples of the present disclosure are feasible for controlled or custom network environments (e.g., data center environment 300 in FIG. 3, enterprise networks, Inter-Access Point Protocol (IAAP) networks, etc.) in which the paths between EP-A 110 and EP-B 120 are under a single autonomous domain. Such custom network environments should be contrasted with public networks (e.g., the Internet) in which endpoints and intermediate devices are usually controlled by different autonomous systems or domains.

Multi-Homed Endpoints

Although single-homed endpoints have been described, it should be understood that the examples in the present disclosure may be implemented by multi-homed endpoints. Unlike conventional MPTCP, however, multiple subflows of the same MPTCP connection may be established over each network interface of the endpoint.

Figure 8:
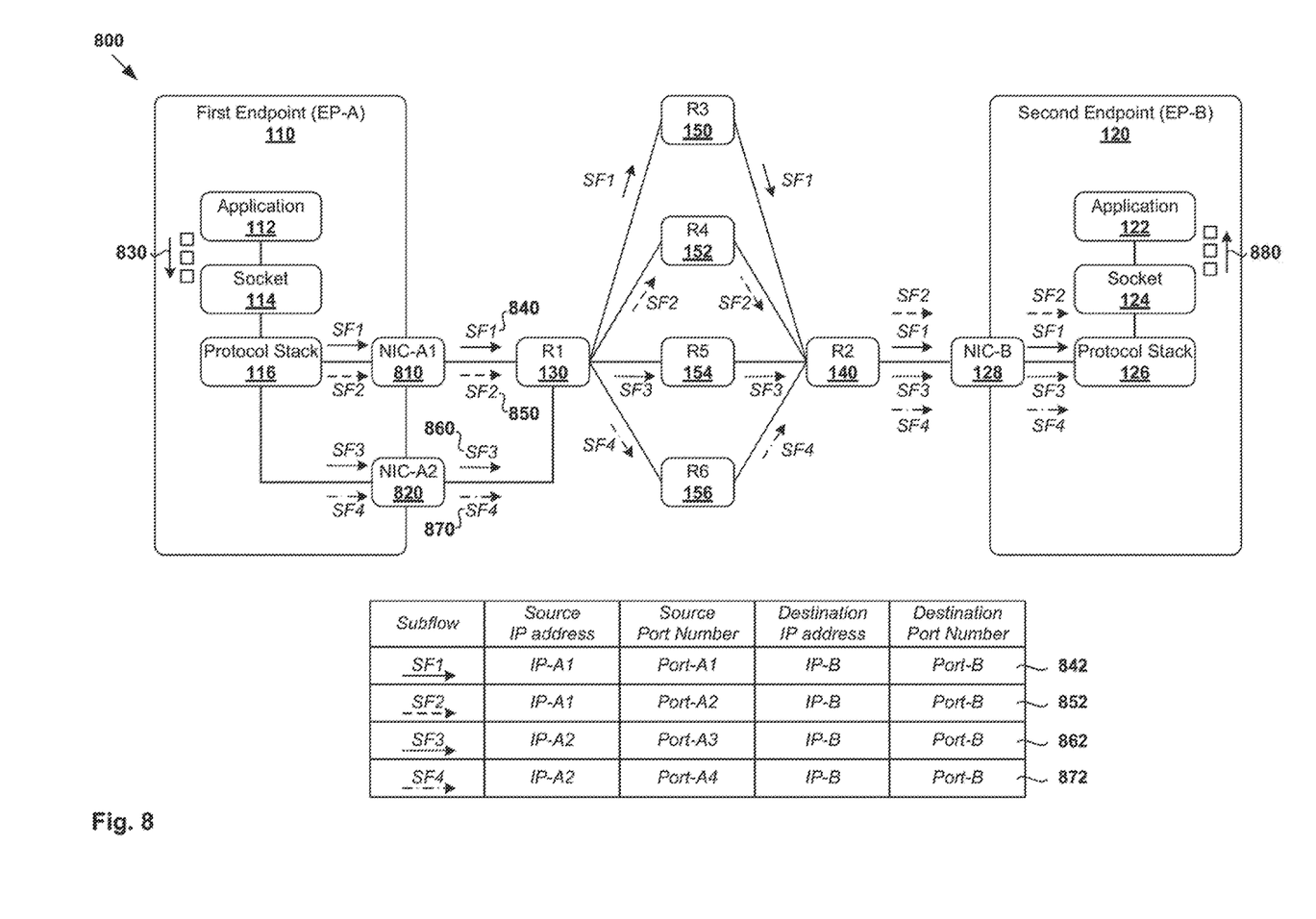
FIG. 8 is a schematic diagram illustrating example network environment with a multi-homed endpoint.

In more detail, FIG. 8 is a schematic diagram illustrating example network environment 800 with multi-homed endpoint 110. Network environment 800 may include additional and/or alternative components than that shown, depending on the desired implementation. Unlike the examples in FIG. 1 and FIG. 3, EP-A 110 is multi-homed with multiple network interfaces. First network interface "NIC-A1" 810 is associated with IP address "IP-A1" and MAC address "MAC-A1", while second network interface "NIC-A2" 820 with IP address "IP-A2" and MAC address "MAC-A2".

In the example in FIG. 8, EP-A 110 may establish multiple subflows over each network interface. For example, elephant flow 830 may be split into smaller flows. Subflows SF1 840 and SF2 850 may be established over first network interface "NIC-A1" 810, and subflows SF3 850 and SF4 860 over second network interface "NIC-A2" 820 to send the smaller flows to EP-B 120. As such, although EP-A 110 only has two network interfaces, it is able to take advantage of the four paths via R1 130 to EP-B 120. This further improves throughput and utilization in network environment 800. At the destination EP-B 120, packets received on SF1 840, SF2 850, SF3 860 and SF4 870 are reassembled and sent to application 122 (see 880).

In general, the examples of the present disclosure may be implemented in any network environment in which endpoints are connected via multiple paths (say M paths, M>1), but have less network interfaces (say N<M). In the first example in FIG. 1 and FIG. 3, M=4 paths and N=1 (i.e., EP-A 110 is single-homed). In the second example in FIG. 8, M=4 paths and N=2 (i.e., EP-A 110 is multi-homed). In both examples, path utilization is improved through the establishment of MPTCP connection.

Further, as explained using FIG. 6 and FIG. 7, EP-A 110 may influence path selection by R1 130 to achieve a more even spread of subflows over multiple paths. In this case, second set of tuples 852 for subflow SF2 850 may be configured based on first set of tuples 842 for subflow SF1 840. In particular, Port-A2 may be configured based on Port-A1 according to the path selection algorithm used by R1 130. The same may be performed when configuring Port-A3 (see 862) for subflow SF3 860 and Port-A4 (see 872) for subflow SF4 870.

Although EP-A 110 is shown as the initiator of the MPTCP connection, it will be appreciated that the examples discussed using FIG. 1 to FIG. 8 may be implemented by EP-B 120. As shown in FIG. 8, EP-B 120 is single-homed and receives packets of all subflows SF1 to SF4 via one network interface "NIC-B" 128. In practice, however, EP-B 120 may also be multi-homed, with each network interface receiving one or more of subflows SF1 to SF4.

The above examples can be implemented by hardware (including hardware logic circuitry), software or firmware or a combination thereof. The above examples may be implemented by any suitable network device or computer system, which may include processor and memory that may communicate with each other via a bus, etc. The network device may include a non-transitory computer-readable medium having stored thereon instructions that, when executed by the processor, cause the processor to perform processes described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first endpoint to perform data transfer between the first endpoint and a second endpoint using a multipath connection, the method comprising:
    detecting an elephant flow of data from an application executing on the first endpoint for transfer to the second endpoint;
    splitting the elephant flow to obtain first packets and second packets, wherein the first endpoint has cognizance of a first path and a second path between a first network interface of the first endpoint and a second network interface of the second endpoint;
    establishing, over the first network interface, a first subflow of a multipath connection with the second endpoint to send the first packets, wherein the first subflow is identified by a first set of tuples that includes a network address of the first network interface and a first port number;
    establishing, over the first network interface, a second subflow of the multipath connection to send the second packets, wherein the second subflow is identified by a second set of tuples that includes the network address and a second port number; and
    sending, over the first network interface, the first packets on the first subflow and the second packets on the second subflow to the second network interface, wherein the first packets travel on the first path based on the first set of tuples and the second packets on the second path based on the second set of tuples.

2. The method of claim 1, wherein the method further comprises:
    configuring the first endpoint to operate in a network-cognizant mode in which the first endpoint has cognizance of multiple paths between the first network interface and the second network interface, wherein the multiple paths include the first path and the second path.

3. The method of claim 2, wherein configuring the first endpoint to operate in the network-cognizant mode comprises:
    based on a total number of the multiple paths, setting a maximum number of subflows of the multipath connection.

4. The method of claim 3, wherein the method further comprises:
    determining that establishing a third subflow of the multipath connection does not exceed the maximum number of subflows; and
    based on cognizance of a third path between the first network interface and the second network interface, splitting the elephant flow to obtain third packets.

5. The method of claim 4, wherein the first endpoint is a multi-homed device with multiple network interfaces that include the first network interface and a further network interface.

6. The method of claim 5, wherein the method further comprises:
    establishing, over the further network interface, a third subflow of the multipath connection to send the third packets, wherein the third subflow is configured with a third set of tuples that includes the network address and a third port number; and
    sending, over the further network interface, the third packets on the third subflow, wherein the third packets travel on the third path based on the third set of tuples to the second network interface.

7. The method of claim 1, wherein detecting the elephant flow comprises:
    detecting the elephant flow based on one or more of the following: an amount of data associated with the elephant flow, a duration associated with the elephant flow, a data transfer rate associated with the elephant flow and an attribute associated with the application.

8. The method of claim 1, wherein the first path and second path are equal-cost paths provided by a leaf switch that connects the first endpoint to a first spine switch and a second spine switch in a data center environment, the leaf switch performing Equal Cost Multipath (ECMP) routing to select the first spine switch for the first packets based on the first set of tuples and second spine switch for the second packets based on the second set of tuples.

9. A non-transitory computer-readable storage medium that includes a set of instructions which, in response to execution by a processor of a computing device, cause the processor to perform a method to transfer data between a first endpoint supported by the computing device and a second endpoint, the method comprising:
    detecting an elephant flow of data from an application executing on the first endpoint for transfer to the second endpoint;

splitting the elephant flow to obtain first packets and second packets, wherein the first endpoint has cognizance of a first path and a second path between a first network interface of the first endpoint and a second network interface of the second endpoint;

establishing, over the first network interface, a first subflow of a multipath connection with the second endpoint to send the first packets, wherein the first subflow is identified by a first set of tuples that includes a network address of the first network interface and a first port number;

establishing, over the first network interface, a second subflow of the multipath connection to send the second packets, wherein the second subflow is identified by a second set of tuples that includes the network address and a second port number; and sending, over the first network interface, the first packets on the first subflow and the second packets on the second subflow to the second network interface, wherein the first packets travel on the first path based on the first set of tuples and the second packets on the second path based on the second set of tuples.

10. The non-transitory computer-readable storage medium of claim 9, wherein the method further comprises:
configuring the first endpoint to operate in a network-cognizant mode in which the first endpoint has cognizance of multiple paths between the first network interface and the second network interface, wherein the multiple paths include the first path and the second path.

11. The non-transitory computer-readable storage medium of claim 10, wherein configuring the first endpoint to operate in the network-cognizant mode comprises:
based on a total number of the multiple paths, setting a maximum number of subflows of the multipath connection.

12. The non-transitory computer-readable storage medium of claim 11, wherein the method further comprises:
determining that establishing a third subflow of the multipath connection does not exceed the maximum number of subflows; and
based on cognizance of a third path between the first network interface and the second network interface, splitting the elephant flow to obtain third packets.

13. The non-transitory computer-readable storage medium of claim 12, wherein the first endpoint is a multi-homed device with multiple network interfaces that include the first network interface and a further network interface.

14. The non-transitory computer-readable storage medium of claim 13, wherein the method further comprises:
establishing, over the further network interface, a third subflow of the multipath connection to send the third packets, wherein the third subflow is configured with a third set of tuples that includes the network address and a third port number; and
sending, over the further network interface, the third packets on the third subflow, wherein the third packets travel on the third path based on the third set of tuples to the second network interface.

15. The non-transitory computer-readable storage medium of claim 9, wherein detecting the elephant flow comprises:
detecting the elephant flow based on one or more of the following: an amount of data associated with the elephant flow, a duration associated with the elephant flow, a data transfer rate associated with the elephant flow and an attribute associated with the application.

16. The non-transitory computer-readable storage medium of 9, wherein the first path and second path are equal-cost paths provided by a leaf switch that connects the first endpoint to a first spine switch and a second spine switch in a data center environment, the leaf switch performing Equal Cost Multipath (ECMP) routing to select the first spine switch for the first packets based on the first set of tuples and second spine switch for the second packets based on the second set of tuples.

17. A computing device configured to perform data transfer between a first endpoint supported by the computing device and a second endpoint, comprising:
a processor;
a first network interface; and
a non-transitory computer-readable medium having stored thereon instructions that, when executed by the processor, cause the processor to:
detect an elephant flow of data from an application executing on the first endpoint for transfer to the second endpoint;
split the elephant flow to obtain first packets and second packets, wherein the first endpoint has cognizance of a first path and a second path between a first network interface of the first endpoint and a second network interface of the second endpoint;
establish, over the first network interface, a first subflow of a multipath connection with the second endpoint to send the first packets, wherein the first subflow is identified by a first set of tuples that includes a network address of the first network interface and a first port number;
establish, over the first network interface, a second subflow of the multipath connection to send the second packets, wherein the second subflow is identified by a second set of tuples that includes the network address and a second port number; and
send, over the first network interface, the first packets on the first subflow and the second packets on the second subflow to the second network interface, wherein the first packets travel on the first path based on the first set of tuples and the second packets on the second path based on the second set of tuples.

18. The computing device of claim 17, wherein the instructions further cause the processor to:
configure the first endpoint to operate in a network-cognizant mode in which the first endpoint has cognizance of multiple paths between the first network interface and the second network interface, wherein the multiple paths include the first path and the second path.

19. The computing device of claim 18, wherein instructions for configuring the first endpoint cause the processor to:
based on a total number of the multiple paths, set a maximum number of subflows of the multipath connection.

20. The computing device of claim 19, wherein the instructions further cause the processor to:
determine that establishing a third subflow of the multipath connection does not exceed the maximum number of subflows; and
based on cognizance of a third path between the first network interface and the second network interface, split the elephant flow to obtain third packets.

21. The computing device of claim 20, wherein the first endpoint is a multi-homed device with multiple network interfaces that include the first network interface and a further network interface.

22. The computing device of claim 21, wherein the instructions further cause the processor to:
  establish, over the further network interface, a third subflow of the multipath connection to send the third packets, wherein the third subflow is configured with a third set of tuples that includes the network address and a third port number; and
  send, over the further network interface, the third packets on the third subflow, wherein the third packets travel on the third path based on the third set of tuples to the second network interface.

23. The computing device of claim 17, wherein instructions for detecting the elephant flow cause the processor to:
  detect the elephant flow based on one or more of the following: an amount of data associated with the elephant flow, a duration associated with the elephant flow, a data transfer rate associated with the elephant flow and an attribute associated with the application.

* * * * *